United States Patent
Schmuck

(10) Patent No.: US 12,129,060 B2
(45) Date of Patent: Oct. 29, 2024

(54) COFFEE GRINDER HAVING FILLING DEVICE FOR REFILLABLE COFFEE CAPSULES

(71) Applicant: Jan Schmuck, Aachen (DE)

(72) Inventor: Jan Schmuck, Aachen (DE)

(73) Assignee: Jan Schmuck, Aachen (DE)

( * ) Notice: Subject to any disclaimer, the term of this patent is extended or adjusted under 35 U.S.C. 154(b) by 322 days.

(21) Appl. No.: 17/418,161

(22) PCT Filed: Dec. 23, 2019

(86) PCT No.: PCT/DE2019/000333
§ 371 (c)(1),
(2) Date: Jun. 24, 2021

(87) PCT Pub. No.: WO2020/135899
PCT Pub. Date: Jul. 2, 2020

(65) Prior Publication Data
US 2022/0097883 A1 Mar. 31, 2022

(30) Foreign Application Priority Data
Dec. 27, 2018 (DE) .......................... 102018009992.0

(51) Int. Cl.
  B65B 29/02 (2006.01)
  A47J 42/40 (2006.01)
  B65B 1/24 (2006.01)
(52) U.S. Cl.
  CPC ............... *B65B 29/02* (2013.01); *A47J 42/40* (2013.01); *B65B 1/24* (2013.01)
(58) Field of Classification Search
  CPC ....... B65B 29/022; B65B 29/02; B65B 59/04; B65B 1/24; A47J 42/40
  See application file for complete search history.

(56) References Cited

U.S. PATENT DOCUMENTS

| 8,683,920 B1 * | 4/2014 | Oropeza | ................... B65B 1/06 141/73 |
| 10,925,430 B2 * | 2/2021 | Bertash | ................. B65B 29/022 |

(Continued)

FOREIGN PATENT DOCUMENTS

| CA | 1185575 A | 4/1985 |
| CH | 282039 A | 4/1952 |

(Continued)

OTHER PUBLICATIONS

International Search Report and Written Opinion with English Translation issued in PCT/DE2019/000333 dated Jun. 2, 2020 (11 pages).

(Continued)

*Primary Examiner* — Andrew M Tecco
(74) *Attorney, Agent, or Firm* — Dority & Manning, P.A.

(57) ABSTRACT

Capsule coffee and capsule coffee machines have become very popular, mainly using disposable capsules. The amount of metal or plastic waste per kilogram of coffee is relatively large, as the capsules must be disposed of after single use. Refillable capsules are offered as an alternative. A disadvantage of all refillable capsules is that it is difficult and hardly reproducible to fill same with the optimal amount of coffee powder. The aim of this invention is to enable fast, clean and reproducible optimal filling of refillable coffee capsules. This is achieved by a filling device for refillable coffee capsules or a coffee grinder having such a filling device. This consists of an access opening and a filling tube through which ground coffee powder can fall into the capsule, a plunger that is guided in the filling tube and can be moved up and down therein in order to compress the coffee powder that has fallen into the capsule, as well as a movable receptacle for a capsule, which movable receptacle is located underneath the filling tube.

10 Claims, 2 Drawing Sheets

(56) References Cited

U.S. PATENT DOCUMENTS

Figure 1:
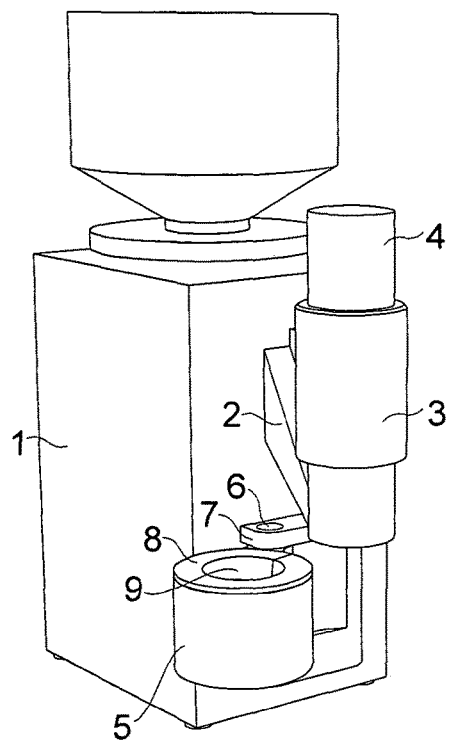

| | | | |
|---|---|---|---|
| 10,988,270 B2* | 4/2021 | Gorbatenko | B65B 51/14 |
| 11,242,166 B2* | 2/2022 | Belbecir | B65B 1/02 |
| 11,659,954 B2* | 5/2023 | Bertash | B65D 85/8046 |
| | | | 426/394 |
| 11,745,906 B2* | 9/2023 | Bertash | B65B 7/2842 |
| | | | 53/268 |
| 2007/0144356 A1* | 6/2007 | Rivera | A47J 31/08 |
| | | | 99/295 |
| 2018/0279822 A1* | 10/2018 | Bertash | B65D 85/8046 |
| 2019/0135466 A1* | 5/2019 | Gorbatenko | B65B 29/022 |
| 2019/0225357 A1* | 7/2019 | Belbecir | B65B 29/06 |

FOREIGN PATENT DOCUMENTS

| | | | | |
|---|---|---|---|---|
| CN | 202801269 U | | 3/2013 | |
| DE | 102016121332 B3 * | | 2/2018 | B65B 29/022 |
| DE | 102016014089 A1 | | 5/2018 | |
| EP | 3312101 A1 | | 1/2016 | |
| FR | 2905683 A1 | | 3/2008 | |
| WO | WO2011/035360 | | 3/2011 | |
| WO | WO-2016029355 A1 * | | 3/2016 | A47J 31/42 |
| WO | WO-2018025136 A1 * | | 2/2018 | B65B 1/02 |

OTHER PUBLICATIONS

Japanese Notice of Reasons for Refusal for corresponding Application No. 2021-538433, dated Oct. 18, 2020, 2 pages.

* cited by examiner

COFFEE GRINDER HAVING FILLING DEVICE FOR REFILLABLE COFFEE CAPSULES

This application is a national phase application of International Patent Application No. PCT/DE2019/000333, filed Dec. 23, 2019, which, in turn, claims priority to German Patent Application No. 102018009992.0, filed Dec. 27, 2018, the entire contents of both of which are hereby incorporated herein by reference.

The present invention relates to a filing device for refillable coffee capsules and to a coffee grinder comprising such a filling device.

Capsule coffee or capsule coffee makers have become widely accepted. In addition to the initial vendor of capsule coffee, a large number of coffee producers are now operating in the market which offer either their own capsule systems, or capsules that are compatible with those of other vendors. The capsules are usually made of metal or plastic, or they are made of both materials. Due to the small amount of typically approximately 5 g of coffee per capsule, the amount of metal and plastic waste per kilogram of coffee is relatively large since the capsules have to be disposed of after one-time use.

As an alternative to the (disposable) capsules, refillable capsules have also been offered by various manufacturers for several years. Such capsules are described, for example, in EP 2 483 177 B1 and FR 2 905 683 A1. These are composed of metal or plastic, or both, and can be cleaned after use and refiled multiple times.

These refillable capsules are compatible with disposable capsules or the capsule coffee makers intended for disposable capsules. Advantages of these refillable capsules are the reduced amount of waste and the option of being able to personally select the coffee, whereby the costs per serving can be considerably reduced or it is possible to deliberately use a certain kind, such as fair trade coffee or organic coffee.

The refillable capsules usually include a rigid lid, which is either connected to the capsule via a hinge or is a separate component having no connection to the capsule. There are also capsules in which the lid is a flexible membrane, which is adhesively attached and removed after each use and replaced with a new membrane.

The refillable capsules can be filled using a spoon or a funnel, for example. Some manufacturers also offer handles to be attached to the capsule, so as to then fill these directly by scooping ground coffee, wherein thereafter the coffee protruding over the edge of the capsule has to be wiped off. The same applies when the capsule is grabbed using the fingers and puled through the ground coffee. The coffee added to the capsule has to be compressed before the capsule is closed with the id. For this purpose, specific hand-held rams, known as tampers, are available for several refillable capsules.

The refillable capsules can be filled with purchased pre-ground coffee or with coffee ground personally from coffee beans.

Whether the coffee beverage from a refillable capsule has a good flavor and a good consistency depends decisively not only on the type of coffee, but on the amount of coffee added to the capsule and the grind size. The use of personally ground coffee is therefore advantageous since the grind size can then be optimally set.

One disadvantage of all refillable capsules thus far is that these can only be filed with difficulty, and hardly in a reproducible manner, with the optimal amount of ground coffee. This would require weighing the necessary amount of coffee for every singe capsule, which is not really practical. Even when a grinder having a settable grinding duration is used, it is cumbersome to collect the respective amount ground for one capsule filing, and to add all of it to the capsule and compress it. This typically results in less than optimal and drastically fluctuating quality of the brewed coffee, which as a result leaves much to be desired compared to that of disposable capsules. Another disadvantage is the cumbersome handling of the capsules during filling, which takes considerably longer than the use of a disposable capsule.

Another disadvantage is that, during filling of the capsules, coffee usually ends up on the edge of the capsules, and thus on the sealing surfaces between the capsule and the lid, which then have to be cleaned prior to closing the capsule.

CN 202 801 269 U relates to a device for coffee makers for filling coffee capsules, this being a device for sealing coffee capsules in conjunction with a coffee maker.

EP 3 312 101 A1 also describes a device for filling coffee capsules which includes a coffee grinder, and more specifically in a variant for consecutively filling and sealing multiple capsules in an automated manner.

WO 2016029 355 A1 describes a device for filling coffee capsules which includes a coffee grinder and a roasting unit for coffee beans, and more specifically likewise in a variant for filling and sealing capsules in an automated manner.

The above-mentioned documents thus al describe a relatively complicated filling process, caused by the automation of the integrated device for sealing the capsules.

The object of enabling rapid, clean, and above all reproducible optimal filling of refillable capsules with personally ground coffee is achieved by DE 10 2016 014 089 A1.

This document describes a coffee grinder comprising a filling tube and a ram. Ground coffee enters the filing tube through a lateral access opening and then drops into a refillable capsule positioned beneath the filling tube. A movable ram is positioned in the filling tube, or can be inserted therein, above the lateral access opening so as to be moved downwardly in the filing tube to compress the coffee that has dropped into the capsule as soon as the filling process of the capsule is completed. The filing tube and the capsule resting closely against the filling tube ensure that the total amount of ground coffee always finds its way into the capsule.

To position the capsule beneath the filing tube, a mount is provided at the filling tube itself or there beneath, which receives the capsule so as to be positioned and held centrally, and preferably as close beneath the filling tube as possible, in particular while the ground coffee is added and compressed.

It is furthermore provided that the mount for the capsule can preferably be designed so that the capsule is pushed from the side, or horizontally, beneath the filing tube, which can be achieved, for example, in that two mutually opposing horizontal U-shaped guides are provided for a capsule having a flange-like edge, which receive the edge of the capsule, thus allowing the capsule to be pushed in horizontally, while being held vertically, directly beneath the filing tube. In the case of capsules without a flange-like edge, it is provided that the capsule could be supported from beneath and guided by lateral guide surfaces, so that this capsule is likewise horizontally displaceable and held in a vertical position beneath the filling tube. The mount is immovably mounted at the coffee grinder in both designs.

Furthermore, it is stated that, after the ground coffee has been compressed in the capsule as a result of an actuation of the ram, the ram is located beneath the edge of the capsule if the capsule was not overfilled. The capsule can then be puled out of the mount without excess ground coffee being pushed out of the capsule by the bottom filing tube edge. This allows very rapid and clean filing of the capsule, which is limited to pushing in the capsule, starting the grinding process, actuating the ram, and removing the capsule.

The disadvantage of this invention is that the described design of the mount must in each case exactly match the cross-section of the capsule, so as the capsule is positioned with sufficient precision beneath the filing tube when pushed in, or is held in the mount without noteworthy play. This applies both to capsules with edges and those without edges. Due to the described mount, the invention described in DE 10 2016 014 089 A1 is thus only suitable for always one specific refillable capsule model.

This disadvantage is to be resolved by the invention described hereafter, which is suitable for rotation-symmetrical refillable capsules having a diameter beneath the flange of 23 mm up to 75 mm, and a height of up to 55 mm, or for non-rotation-symmetrical refillable capsules having a circumferential size squared of up to 75 mm×75 mm beneath the flange, and a height of up to 60 mm.

The invention is described in the independent claims. Preferred embodiments of the invention can be found in the dependent claims.

A coffee grinder comprising a filling tube and a ram, as described in DE 10 2016 014 089 A1, is designed with a mount for a refillable capsule, in which, however, the receptacle for the capsule is designed to be movable. In this way, the receptacle, together with the capsule, can be moved beneath the filling tube or away therefrom.

This can take place either by a lateral or horizontal pivoting movement of the receptacle, or by a linear movement of the receptacle. The receptacle for the capsule includes a depression, which can receive a refillable capsule. The receptacle for the capsule can be designed so as to either be easy to replace itself or to include a replaceable insert that receives the capsule. As a result of different designs of the depression for receiving the capsule, the coffee grinder can be used for different refillable capsules.

In addition, it is possible in the case of the present invention to replace the receptacle for the capsule with a container having a larger volume. In this way, it is also possible to grind larger amounts of coffee using the coffee grinder, so that the amount can thus also be used for other purposes, such as for example the preparation of filter coffee.

The following description references the accompanying drawings:

Coffee grinder shall mean any kind of coffee grinder that outputs the ground coffee through a discharge opening during the grinding process.

Access opening shall mean a channel through which the ground coffee is able to slide on its own from the discharge opening of the coffee grinder into the filling tube, as a result of a sufficient inclination of the channel. The access opening is fixedly connected to the coffee grinder during use.

Filing tube shall mean a space that is closed laterally, but open at the top and bottom, in which a ram can be moved vertically up and down, which has a lateral opening through which the ground coffee can drop out of the access opening into the filing tube and, through this filling tube, into the refillable capsule positioned therebeneath. The filing tube is fixedly connected to the coffee grinder during use.

Receptacle for the capsule shall mean a component that is fastened the coffee grinder so as to be movable with respect to the filling tube, and thus also the coffee grinder, which includes a depression on the top side into which a refillable capsule can be inserted and which is held in this position due to the shape of the depression. The connection to the coffee grinder is established via a mount at which the receptacle for the capsule is movably mounted or movably held.

Mount shall mean a structure that establishes the connection between the receptacle for the capsule and the coffee grinder. This mount holds a receptacle for the capsule either directly by way of a corresponding shape, or by means of a further component, such as for example a structure having the function of a shaft. The mount can be a separate component which is attached to the coffee grinder, or it may be an integral part of a component of the coffee grinder, for example of a housing part.

Replaceable insert shall mean a separate component which includes the depression for the capsule, unless the capsule is directly introduced into the receptacle for the capsule. When a replaceable insert is used, it is always mounted in the receptacle for the capsule.

Structure having the function of a shaft shall mean either one or more separate shafts, or one or more structures, which can be an integral part of either the receptacle for a refillable capsule (5) or of the mount (7) and which allow a rotational movement of another component about itself.

The vertical structure having the function of a shaft can either be one or more separate shafts, or one or more structures, which can be an integral part of either the receptacle for a refillable capsule or of the mount.

Figure 2:
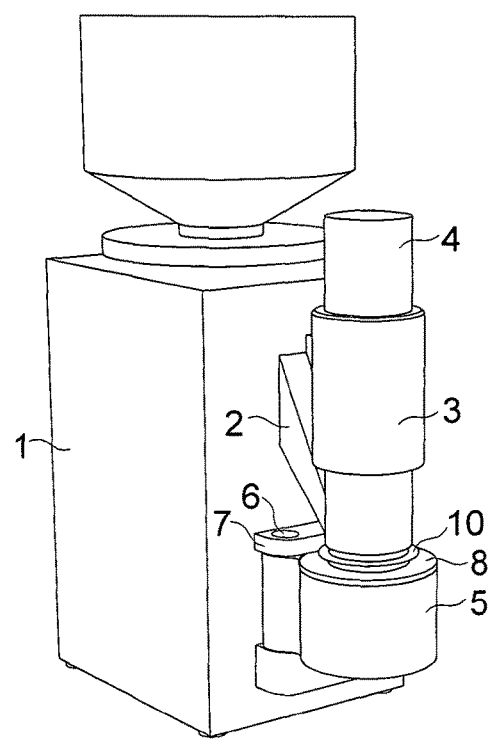

FIGS. 1 and 2 show a preferred exemplary embodiment of a grinder comprising a receptacle for a capsule which can be pivoted to the side, comprising a coffee grinder (1) including a lateral access opening (2) through which the ground coffee finds its way into the filing tube (3) and the ram (4) guided therein. A receptacle for the capsule (5), which can be pivoted toward one side, is located beneath the filling tube (3). This rotates about a vertical structure having the function of a shaft (6), which is a separate component and attached in a mount (7), for example by comprising an external thread at the lower end and being screwed from beneath into an internal thread in the mount (7). The mount (7) is fixedly connected to the housing of the coffee grinder. This may either be a separate part mounted to the coffee grinder (1), or an integral part of the housing of the coffee grinder. The mount (7) is designed here so as to support the receptacle for the capsule (5) from beneath and extends over the same from above. In this way, the receptacle for the capsule (5) can only be removed from the coffee grinder after the structure having the function of a shaft (6) has been removed. As an alternative, the mount (7) can also be designed so as to only support the receptacle for the capsule (5) from beneath, so that the receptacle for the capsule (5) can be placed from above onto the structure having the function of a shaft (6). This is useful when the depression (9) for receiving the capsule is not arranged in a replaceable insert (8), but directly in the receptacle for the capsule (5). The receptacle for the capsule (5) can then simply be pulled off toward the top to clean or replace it. The structure having the function of a shaft (6) can also be designed so as to not be visible from above or from the side, by being a separate component and mounted from above in the mount.

In this exemplary embodiment, the receptacle for the capsule (5) comprises a replaceable insert (8), which can be removed toward the top from the receptacle for the capsule (5), including a depression (9), which fits a particular type of capsules. A capsule (10) is inserted into the depression (9). In this example, the receptacle for the capsule (5), the structure having the function of a shaft (6), the mount (7), and the replaceable insert (8) are each intended as separate injection-molded plastic parts. However, these can also be made of metal, for example in the form of light metal die cast parts.

Figure 3:
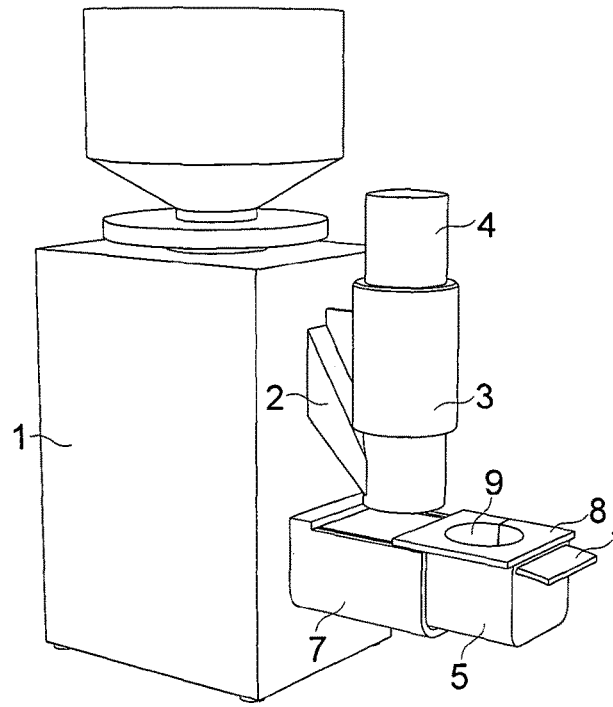
Figure 4:
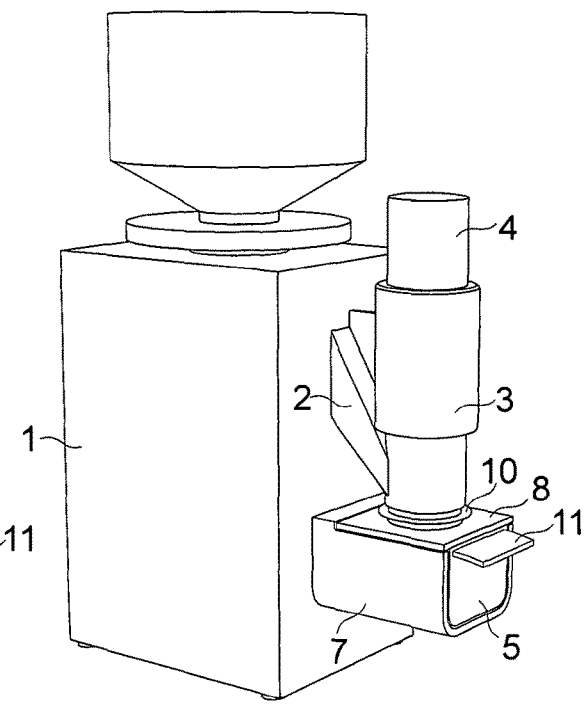

FIGS. 3 and 4 show another exemplary embodiment comprising a linearly movable receptacle for a capsule, comprising a coffee grinder (1), including a lateral access opening (2) through which the ground coffee find its way into the filing tube (3), and a ram (4) guided therein. A receptacle for the capsule (5), which can be pulled out forwardly in a linear movement from beneath the filing tube (3), is located beneath the filling tube (3). For this purpose, a handle (11) is arranged on the front of the receptacle for the capsule (5). The receptacle for the capsule (5) is guided in a mount (7). The inner cross-section in the movement direction corresponds to that of the receptacle for the capsule (5) so as to guide it with little play during the linear movement. As an alternative, the receptacle for the capsule (5) can also include two lateral grooves in the movement direction, in which two tongues engage, which are provided at the mount (7), so as to decrease the contact surface between the receptacle for the capsule (5) and the mount (7), resulting in easier movability. The linear movement of the receptacle for the capsule (5) can be limited by a stop, so that the capsule can only be pulled out of the mount (7) up to a certain point, which allows the capsule (10) to be removed upwardly out of the receptacle for the capsule (5).

In this exemplary embodiment, the receptacle for the capsule (5) comprises a replaceable insert (8), which can be removed toward the top from the receptacle for the capsule (5), including a depression (9), which fits a particular type of capsules. A capsule (10) is inserted into the depression (9). In this example, the receptacle for the capsule (5), the replaceable insert (8), and the mount (7) are each intended as separate injection-molded plastic parts. The handle (11) is designed as an integral part of the receptacle for the capsule (5). However, all parts can also be made of metal, for example in the form of light metal die cast parts.

Figures 5, 6:
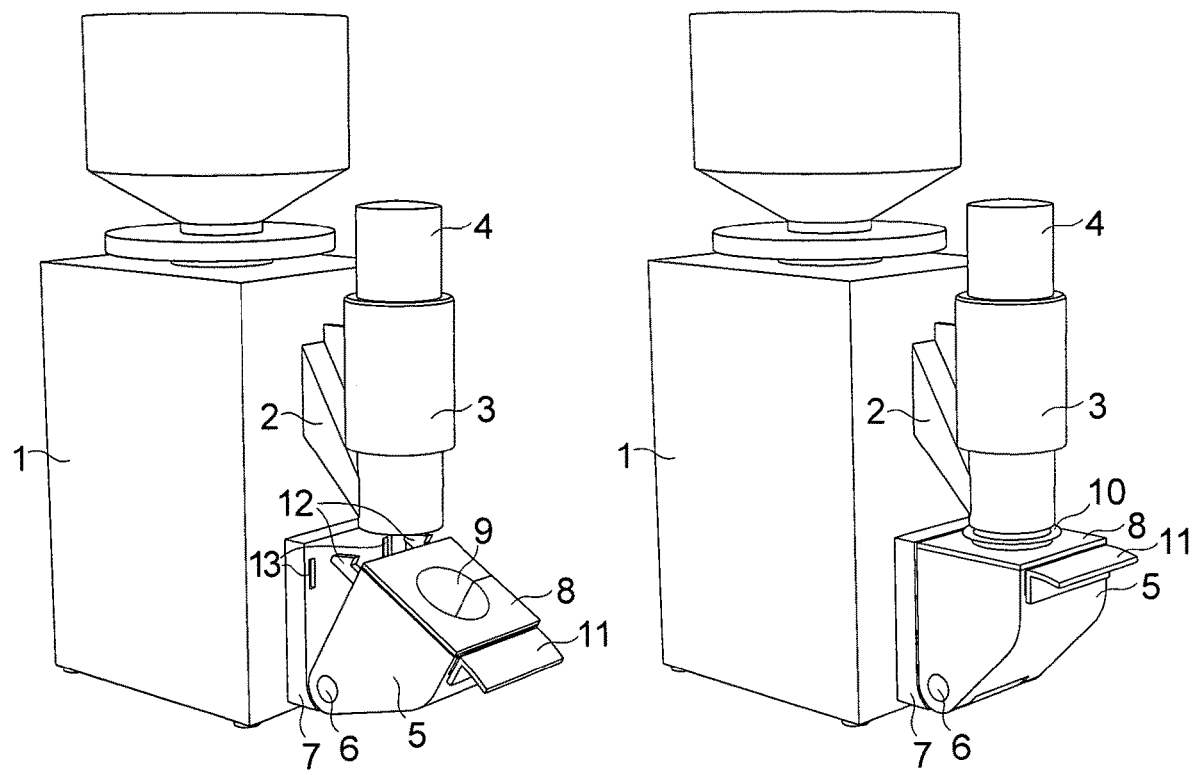

FIGS. 5 and 6 show another exemplary embodiment comprising a horizontally tiltable receptacle for a capsule, comprising a coffee grinder (1), including a lateral access opening (2) through which the ground coffee find its way into the filing tube (3), and a ram (4) guided therein. A receptacle for the capsule (5), which can be tilted forwardly in a horizontal pivoting movement from beneath the filling tube (3), is located beneath the filling tube (3). This rotates about a horizontal structure having the function of a shaft (6), which is fastened in a mount (7).

In this exemplary embodiment, the shaft is not continuous, but one shaft stub is located on each side of the mount (7). The receptacle for the capsule (5) is designed as an injection-molded plastic part in this example, and is open at the back. The two side walls of the receptacle for the capsule (5), including the two holes for the shafts, can thus be easily bent outwardly, so as to be pushed over the two shaft stubs and then spring back into the original shapes thereof. As an alternative, a separate shaft can also be used, which extends through the receptacle for the capsule (5) and the mount (7) and is then secured by a screw to prevent axial displacement. In this exemplary embodiment, the receptacle for the capsule (5) has to be held by a locking mechanism in the upper position beneath the filling tube (3). This is achieved in the present example in that the movable handle (11) comprises two hooks (12), which protrude on the back of the receptacle for the capsule (5). By way of a shaft, the hooks (12) are movably connected to the capsule, in each case centrally on the inner sides of the receptacle for the capsule (5). Raising of the handle (11) thus causes the hooks (12) on the back of the receptacle for the capsule (5) to be lowered. The handle (11) including the hooks (12) is designed so as to be loaded by a resilient element, which always returns the hooks (12) to the upper position as soon as the handle (11) is released. When the receptacle for the capsule (5) is pushed into the position beneath the filling tube (3), the two hooks (12) move into the two openings (13) in the mount (7). In the process, the oblique upper surfaces of the hooks (12) are pushed downwardly by the upper edge of the openings (13) when these move into the openings (13). When the hooks (12) have moved completely into the openings (13), the hooks (12) snap upwardly behind the wall of the mount (7) and hold the receptacle for the capsule (5) in the position beneath the filling tube (3). If the handle (11) is raised in this state, the hooks (12) are lowered in the openings (13), and the receptacle for the capsule (5) can be pivoted forwardly. In this exemplary embodiment, the depression (9) for receiving the capsule (10) is implemented in a removable insert (8) in the receptacle for the capsule (5), which can be replaced with another insert when a different type of capsule is to be used.

In this example, the receptacle for the capsule (5), the mount (7), and the replaceable insert (8) are each intended as separate injection-molded plastic parts. The handle (11) is designed as an integral part of the receptacle for the capsule (5). However, al parts can also be made of metal, for example in the form of light metal die cast parts.

LIST OF REFERENCE NUMERALS (1) coffee grinder
(2) access opening
(3) filling tube
(4) ram
(5) receptacle for the capsule
(6) structure having the function of a shaft
(7) mount
(8) replaceable insert
(9) depression for the capsule
(10) refillable capsule
(11) handle
(12) hook
(13) openings

The invention claimed is:

1. A coffee grinder for grinding coffee, comprising a filling device for refillable coffee capsules, including a filling tube, comprising an access opening, through which ground coffee can drop into the filling tube, and furthermore comprising a ram, which is guided in the filling tube and can be moved up and down therein so as to compress the ground coffee that has dropped from the coffee grinder through the access opening and the filling tube into the refillable coffee capsule, wherein a receptacle for the refillable coffee capsule is selectively positionable beneath the filling tube, which on a top side defines an entirety of a circumference of a depression for receiving the refillable coffee capsule and which, by way of a vertical shaft, is mounted in a mount present at the coffee grinder and can be pivoted to the side, so that the refillable coffee capsule in the depression, in both end positions of the pivoting movement, ends up either beneath the filling tube and can be filled, or can be pivoted out from beneath the filling tube so far so as to be removable toward the top, and further comprising an arm extending from the vertical shaft to an exterior circumferential surface of the receptacle, the arm pivotably coupled relative to a housing of the coffee grinder such that the receptable is pivotable relative to the filling tube.

2. The coffee grinder according to claim 1, wherein the mount for the shaft is either an integral part of the housing of the coffee grinder, or a separate part that is attached to the coffee grinder.

3. The coffee grinder according to claim 1, wherein the shaft is fixedly mounted in the mount and can rotate freely in the receptacle for the refillable coffee capsule, or that the shaft can rotate freely in the mount and is fixedly mounted in the receptacle for the refillable coffee capsule.

4. The coffee grinder according to claim 1, further comprising a replaceable insert which is fastened to the pivotable receptacle for the refillable coffee capsule, defines the depression for the refillable coffee capsule, and receives the refillable coffee capsule.

5. The coffee grinder of claim 1, further comprising an end stop for the receptacle for the refillable coffee capsule, wherein, when the receptacle is pivoted towards the filling tube, the end stop stops the receptacle for the refillable coffee capsule beneath the filling tube.

6. The coffee grinder of claim 1, wherein the arm is fixedly coupled to the exterior circumferential surface of the receptacle.

7. A coffee grinder for grinding coffee, comprising a filling device for refillable coffee capsules, including a filling tube comprising an access opening, through which the ground coffee can drop into the filling tube, and furthermore comprising a ram, which is guided in the filling tube and can be moved up and down therein so as to compress the coffee that has dropped from the coffee grinder through the access opening and the filling tube into the refillable coffee capsule, wherein a receptacle for the refillable coffee capsule is provided beneath the filling tube, which on a top side includes a depression for receiving the refillable coffee capsule, which includes a horizontal shaft, which in turn is mounted in a mount present at the coffee grinder and allows a horizontal pivoting movement of the receptacle for the refillable coffee capsule, so that the refillable coffee capsule in the depression, in both end positions of the pivoting movement, ends up either beneath the filling tube and can be filled, or can be pivoted out from beneath the filling tube so far so as to be removable toward the top.

8. The coffee grinder according to claim 7, further comprising a replaceable insert which is fastened to the pivotable receptacle for the refillable coffee capsule, defines the depression for the refillable coffee capsule, and receives the refillable coffee capsule.

9. The coffee grinder according to claim 7, wherein the receptacle for the refillable coffee capsule comprises at least one hook, which can be moved about a horizontal shaft, including a handle, which can be moved in such a way that the oblique surface of the hook, during a movement of the receptacle for the refillable coffee capsule against a surface of the mount that is hollow and has at least one opening, strikes against the edge thereof, moves and, during further movement, the oblique surface of the hook slides completely into the opening, and the hook then moves behind the wall of the hollow mount, thereby holding the receptacle for the refillable coffee capsule in a position in which the refillable coffee capsule is located directly beneath the filling tube, wherein, as a result of the handle being pushed, the hook moves in such a way that the tip thereof is no longer located behind the wall of the hollow mount, but moves so far so as to fit precisely through the opening, thus allowing the receptacle for the refillable coffee capsule to be moved into a different end position in which the refillable coffee capsule can be removed.

10. A coffee grinder for grinding coffee, comprising a filling device for refillable coffee capsules, including a filling tube, comprising an access opening, through which ground coffee can drop into the filling tube, and furthermore comprising a ram, which is guided in the filling tube and can be moved up and down therein so as to compress the ground coffee that has dropped from the coffee grinder through the access opening and the filling tube into the refillable coffee capsule, wherein a receptacle for the refillable coffee capsule is selectively positionable beneath the filling tube, which on a top side defines a depression for receiving the refillable coffee capsule and which, by way of a vertical shaft, is mounted in a mount present at the coffee grinder and can be pivoted to the side, so that the refillable coffee capsule in the depression, in both end positions of the pivoting movement, ends up either beneath the filling tube and can be filled, or can be pivoted out from beneath the filling tube so far so as to be removable toward the top, and further comprising an arm extending from the vertical shaft to an exterior circumferential surface of the receptacle, the arm pivotably coupled relative to a housing of the coffee grinder such that the receptable is pivotable relative to the filling tube.

* * * * *